United States Patent
Lee et al.

[11] Patent Number: 5,805,556
[45] Date of Patent: Sep. 8, 1998

[54] OPTICAL PICKUP APPARATUS HAVING A HOLOGRAPHIC OPTICAL ELEMENT

[75] Inventors: Chul-woo Lee; Jang-hoon Yoo, both of Seoul; Yong-hoon Lee; Kyung-hwa Rim, both of Suwon, all of Rep. of Korea

[73] Assignee: Samsung Electronics Co., Ltd., Suwon, Rep. of Korea

[21] Appl. No.: 777,130

[22] Filed: Dec. 30, 1996

[51] Int. Cl.⁶ ........................................................ G11B 7/00
[52] U.S. Cl. .............................................. 369/103; 369/109
[58] Field of Search ..................................... 369/112, 109, 369/103, 110, 44.12, 44.23, 44.24

[56] References Cited

U.S. PATENT DOCUMENTS

| | | | |
|---|---|---|---|
| 562,919 | 4/1896 | Hayashi et al. | 369/112 |
| 4,458,980 | 7/1984 | Okki et al. | 369/112 |
| 5,180,909 | 1/1993 | Ohyama et al. | 369/44.12 |
| 5,200,939 | 4/1993 | Nishiwaki et al. | 369/44.12 |
| 5,204,516 | 4/1993 | Upheap | 369/44.12 |
| 5,231,620 | 7/1993 | Ohuchida | 369/109 |
| 5,272,329 | 12/1993 | Nagahama et al. | 369/44.12 |
| 5,361,244 | 11/1994 | Nakamura et al. | 369/44.12 |
| 5,416,765 | 5/1995 | Aikoh et al. | 369/109 |
| 5,422,870 | 6/1995 | Kojima et al. | 369/112 |
| 5,440,427 | 8/1995 | Miyake et al. | 369/109 |
| 5,446,719 | 8/1995 | Yoshida et al. | 369/44.12 |
| 5,481,386 | 1/1996 | Shimano et al. | 369/112 |
| 5,523,993 | 6/1996 | Freeman | 369/109 |
| 5,570,333 | 10/1996 | Katayama | 369/44.12 |
| 5,583,843 | 12/1996 | Horinouchi | 369/112 |
| 5,608,695 | 3/1997 | Yamazaki et al. | 369/112 |
| 5,621,716 | 4/1997 | Kojima et al. | 369/112 |

FOREIGN PATENT DOCUMENTS

| | | | |
|---|---|---|---|
| 61-267946 | 11/1986 | Japan . | |
| 62-103857 | 5/1987 | Japan . | |
| 63-25845 | 2/1988 | Japan . | |
| 1-150236 | 6/1989 | Japan . | |
| 2-193333 | 7/1990 | Japan | 369/103 |
| 3-292644 | 12/1991 | Japan | 369/109 |
| 4-75050 | 3/1992 | Japan | 369/103 |
| 6-73980 | 3/1993 | Japan . | |
| 6-76398 | 3/1994 | Japan . | |

*Primary Examiner*—Nabil Hindi
*Attorney, Agent, or Firm*—Staas & Halsey

[57] ABSTRACT

An optical pickup apparatus for recording and reproducing information, which is manufactured to be extremely small in a hybrid type. The optical pickup apparatus includes a first holographic optical element as a beam expander for diffracting to enlarge a diverging angle of an incident beam emitted from a light source and a second holographic optical element as an object lens for diffracting the incident beam whose diverging angle is enlarged by the first holographic optical element to focus the incident beam on an optical disk. Here, the first holographic optical element has a function of a beam splitter for diffracting a reflected beam to be separated as well as a function of a beam expander. The optical pickup apparatus is manufactured to be extremely small and ultralight due to its short optical path. Therefore, the optical pickup apparatus is influential on the miniaturization of various optical information processing systems, and contributes to a stable operation and a high speed search due to its excellent optical performance.

22 Claims, 6 Drawing Sheets

OPTICAL PICKUP APPARATUS HAVING A HOLOGRAPHIC OPTICAL ELEMENT

BACKGROUND OF THE INVENTION

1. Field of the Invention

The present invention relates to an optical pickup apparatus for optically recording and reproducing information, and more particularly, to an extremely small optical pickup apparatus in which all parts can be integrally formed in a hybrid type.

Recently, as various systems for optically processing information are widely being used, the need for a small and light optical pickup apparatus which is an essential component in an optical-processing of information has increased. The small and light optical pickup apparatus can reduce the size and weight of the whole optical system, and further, integrally drive all optical parts of the optical pickup apparatus, including an object lens, guaranteeing a stable operation without errors and a high speed seeking of information even when a medium vibrates.

2. Description of the Related Art

Generally, the optical pickup apparatus is divided into a beam emitting portion located on an optical path of an incident beam and a beam receiving portion located on an optical path of a reflected beam, where the size and weight of the optical pickup apparatus can be reduced by curtailing the number of parts required in each portion and arranging each part in its optimal position.

An example of a conventional small optical pickup apparatus is shown in FIG. 1. In FIG. 1, reference numeral 1 represents a semiconductor laser for generating a laser beam; reference numeral 2 represents a hologram lens for diffracting the beam reflected from an optical disk 5 in order to separate the reflected beam from the optical path of an incident beam; reference numeral 3 represents a collimating lens for collimating the laser beam emitted from the semiconductor laser 1; reference numeral 4 represents an object lens for focusing the collimated beam on the optical disk 5; and reference numeral 6 represents a photodetector for detecting an electrical signal by receiving the reflected beam which is separated by the hologram lens 2. Here, the hologram lens 2 is used for separating the beam which is reflected from the optical disk 5 from the optical path of the beam which is emitted from the semiconductor laser 1 toward the optical disk 5, by diffracting the reflected beam, so that the photodetector 6 installed next to the semiconductor laser 1 receives the separated reflected beam. That is, in the conventional optical pickup apparatus, a hologram lens is adopted to separate the reflected beam from the optical path of the incident beam, thereby reducing a space occupied by the beam emitting portion and the beam receiving portion, compared with a general optical pickup apparatus adopting a beam splitting prism or a half mirror.

However, in the above conventional optical pickup apparatus, the object lens should maintain a predetermined object distance from a light source in order to correct aberration caused by the thickness of a disk substrate and secure a practically manufacturable curvature. Substantially, the incident beam upon the object lens should have a diameter of about 4 mm. Thus, considering that a minimum emitting angle of the semiconductor laser is about 6°, the semiconductor laser and the object lens should be spaced by at least 30 mm. That is, the conventional optical pickup requires a large enough object distance from the light source to the object lens, resulting in a limitation in miniaturization. Further, due to a relatively long optical path, aberration occurs due to the shift and tilt of the optical axis from the vibration of the optical disk during operation, resulting in an inferior optical performance. Also, the operation of the apparatus becomes unstable by the frequent servo errors.

SUMMARY OF THE INVENTION

It is an object of the present invention to provide an extremely small optical pickup apparatus having a structure integrally manufactured in a hybrid type.

It is another object of the present invention to provide an extremely small optical pickup apparatus having a very short optical path to provide an excellent optical performance.

It is still another object of the present invention to provide an extremely small optical pickup apparatus having an excellent durability.

It is yet another object of the present invention to provide an extremely small optical pickup apparatus which can be integrally operated.

To achieve the above and other objects, there is provided an optical pickup apparatus for optically recording and reproducing information, including a light source for generating and emitting a light beam, means for focusing the beam emitted from the light source on an optical recording medium such as an optical disk, means for separating a beam reflected from the optical recording medium from the optical path of the incident beam from the light source to the optical recording medium, and a photodetector for detecting an electrical signal by receiving the reflected beam separated by the beam separating means, the optical pickup apparatus comprising a holographic optical element for diffracting the beam diverged from the light source to enlarge a diverging angle of the beam.

Also, there is provided an optical pickup apparatus for optically recording and reproducing information, including a light source for generating and emitting an incident beam to an optical recording medium, means for separating a beam reflected from the optical recording medium from the optical path of the incident beam, and a photodetector for detecting an electrical signal by receiving the reflected beam separated by the beam separating means, the optical pickup apparatus comprising a first holographic optical element for diffracting the incident beam emitted from the light source to enlarge a diverging angle of the incident beam; and a second holographic optical element for diffracting and focusing the incident beam whose diverging angle is enlarged by the first holographic optical element on the optical recording medium.

Preferably, the first holographic optical element further performs a function of diffracting the reflected beam so as to separate the reflected beam from the optical path of the incident beam.

In addition, there is provided an optical pickup apparatus for optically recording and reproducing information on and from an optical recording medium, comprising a light source for generating and emitting a light beam; a transparent plate member located between the light source and the optical recording medium, having a first holographic pattern formed on an incident surface thereof facing the light source, for diffracting the beam diverged from the light source to enlarge a diverging angle of the beam and diffracting the beam reflected from the optical recording medium to separate the reflected beam from the optical path of the incident beam, and a second holographic pattern formed on an emergent surface thereof facing the surface of the optical recording medium, for diffracting and focusing the incident beam whose diverging angle is enlarged by the first holographic pattern on the optical recording medium; a photodetector for detecting an electrical signal by receiving the reflected beam separated by the first holographic pattern; and housing means for integrally accommodating the light source, the plate member and the photodetector.

Further, preferably, the optical pickup apparatus further comprises a holder for holding and supporting the housing means; means for elastically supporting the holder to be movable at least in the horizontal and vertical directions and to be returned to an initial position after the movement; and means for driving the holder to move at least in the horizontal and vertical directions.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

Figure 1:
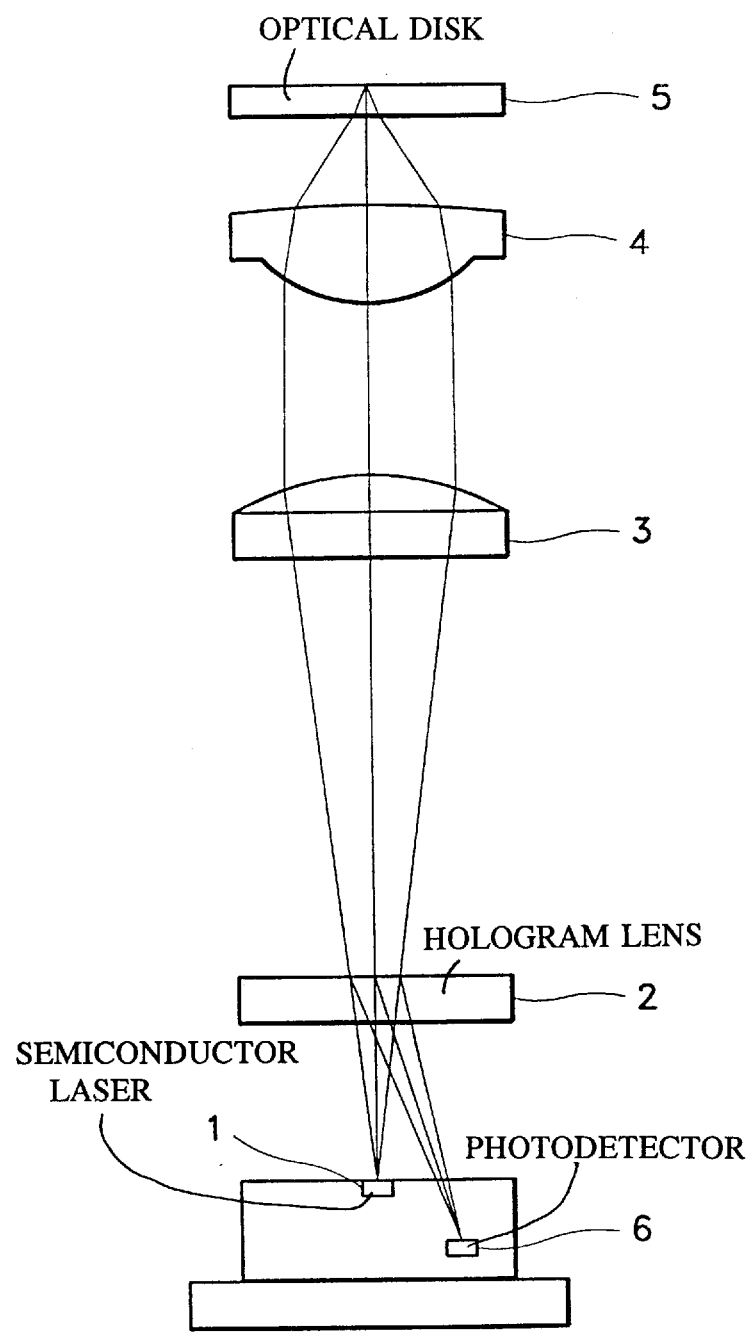
FIG. 1 is a diagram schematically showing the optical structure of a conventional optical pickup apparatus adopting a hologram.
Figure 2:
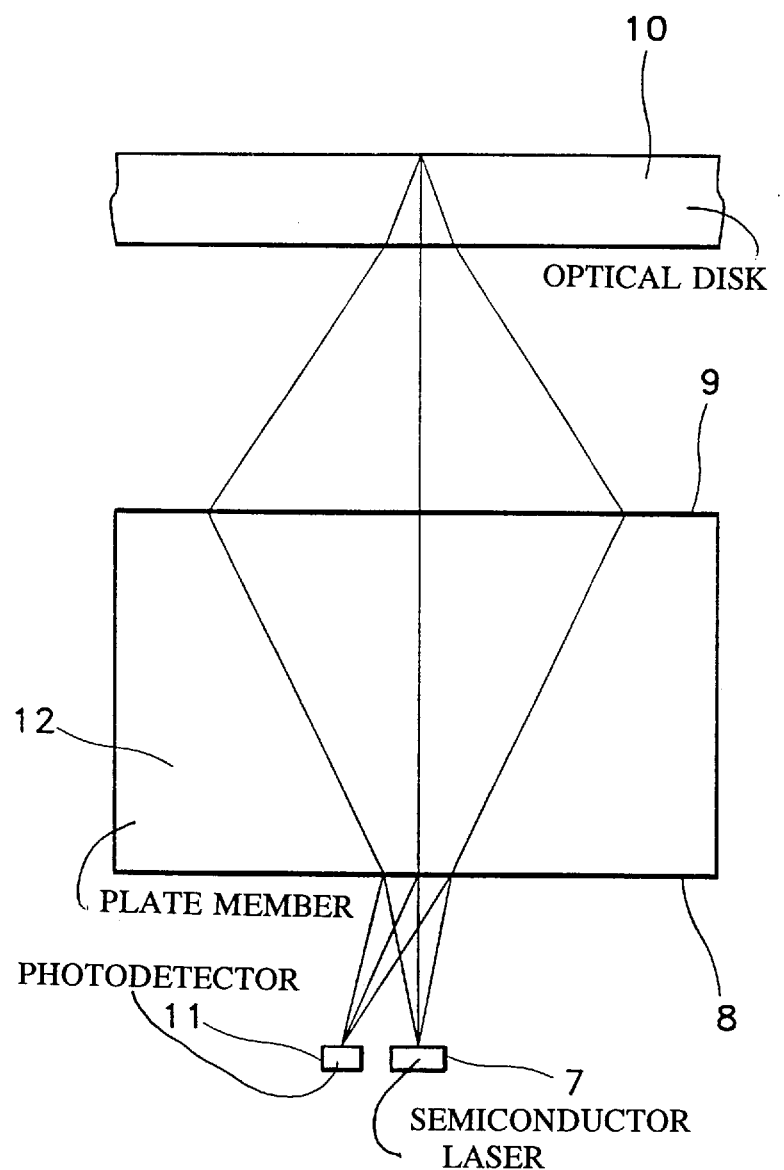
FIG. 2 is a diagram schematically showing an optical structure of an optical pickup apparatus according to the present invention.

An optical pickup apparatus according to the present invention, as shown in FIG. 2, includes a semiconductor laser 7 as a light source, a first holographic optical element (HOE) 8 for diffracting to enlarge a diverging angle of the beam emitted from the semiconductor laser 7 and simultaneously to separate the beam reflected from an optical disk 10 from the optical path of a beam incident thereupon, a second HOE 9 for diffracting the incident beam having a diverging angle enlarged by the first HOE 8 to thus focus the incident beam on the optical disk 10, and a photodetector 11 located next to the semiconductor laser 7, for detecting an electrical signal by receiving the reflected beam which is diffracted and separated by the first HOE 8. Here, preferably, a plate member 12 like a glass plate through which the beam transmits is provided between the first HOE 8 and the second HOE 9.

Figure 3:
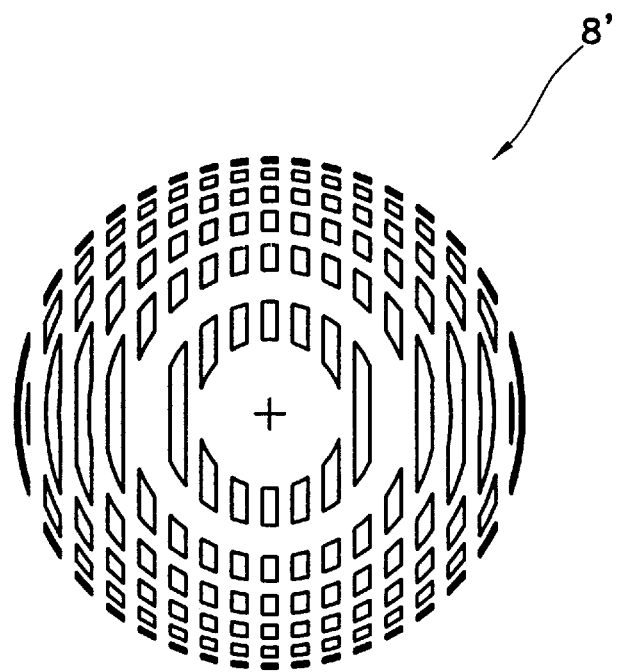
FIG. 3 is a view showing a hologram pattern for a holographic optical element (HOE) which is used as a beam expander or beam splitter in the optical pickup apparatus of the present invention.
Figure 4:
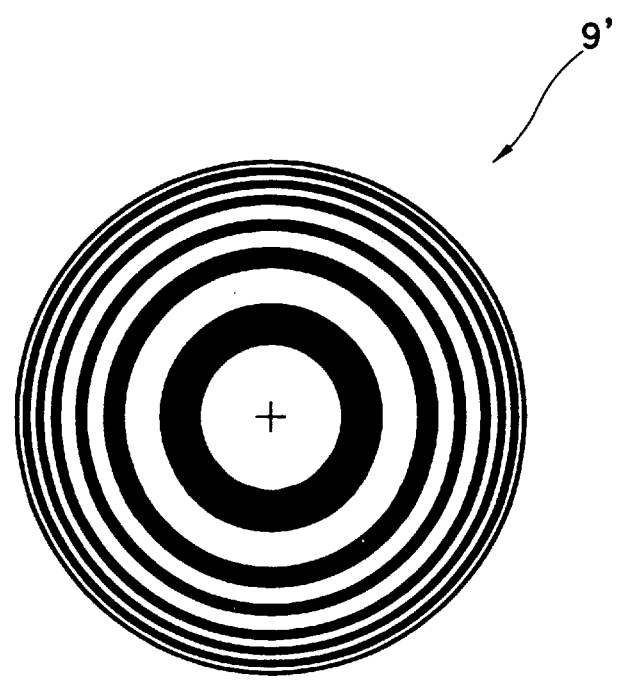
FIG. 4 is a view showing a hologram pattern for an HOE which is used as an objective lens in the optical pickup apparatus of the present invention.

Substantially, the first HOE 8 and the second HOE 9 are provided by directly forming a first hologram pattern 8' on an incident surface of the plate member 12, facing the semiconductor laser 7, and a second hologram pattern 9' on an emergent surface thereof, facing the optical disk 10, as shown in FIGS. 3 and 4, respectively. The first hologram pattern 8' is formed by overlapping a plurality of concentric circles, in which the intervals between adjacent circles become less as the distance from the optical center (+) of the beam increases, and a plurality of stripes in a predetermined direction. The first hologram pattern 8' functions as a beam expander and a beam splitter by enlarging the diverging angle of the incident beam from the semiconductor laser 7 and slantly separating the beam reflected from the optical disk 10 from the optical path of the beam incident thereupon through the plurality of the concentric circles. Also, the second hologram pattern 9' has a plurality of concentric circles in which the intervals between adjacent circles become less as the distance from the center (+) increases and functions as an object lens for focusing an optical spot on the optical disk 10 by diffracting the incident beam whose diverging angle is enlarged by the first hologram pattern 8'.

The following are optical conditions of the optical pickup apparatus according to the present invention, which are obtained through a simulation test for an optimized embodiment of an extremely small optical pickup apparatus.

Interval between the semiconductor laser 7 and the first HOE 8: 1 mm

Hologram pattern of the first HOE 8;
    Focal distance of object ray: 0.25 mm
    Focal distance of reference ray: ∞

Plate member 12;
    Thickness: 3mm
    Refractive index: 1.515

Hologram pattern of the second HOE 9;
    Focal distance of object ray: 0.25mm
    Focal distance of reference ray: ∞

Interval between the second HOE 9 and the optical disk 10: 1.5 mm

Optical disk 10;
    Thickness of substrate: 0.6 mm
    Refractive Index of substrate: 1.55

Figure 5:
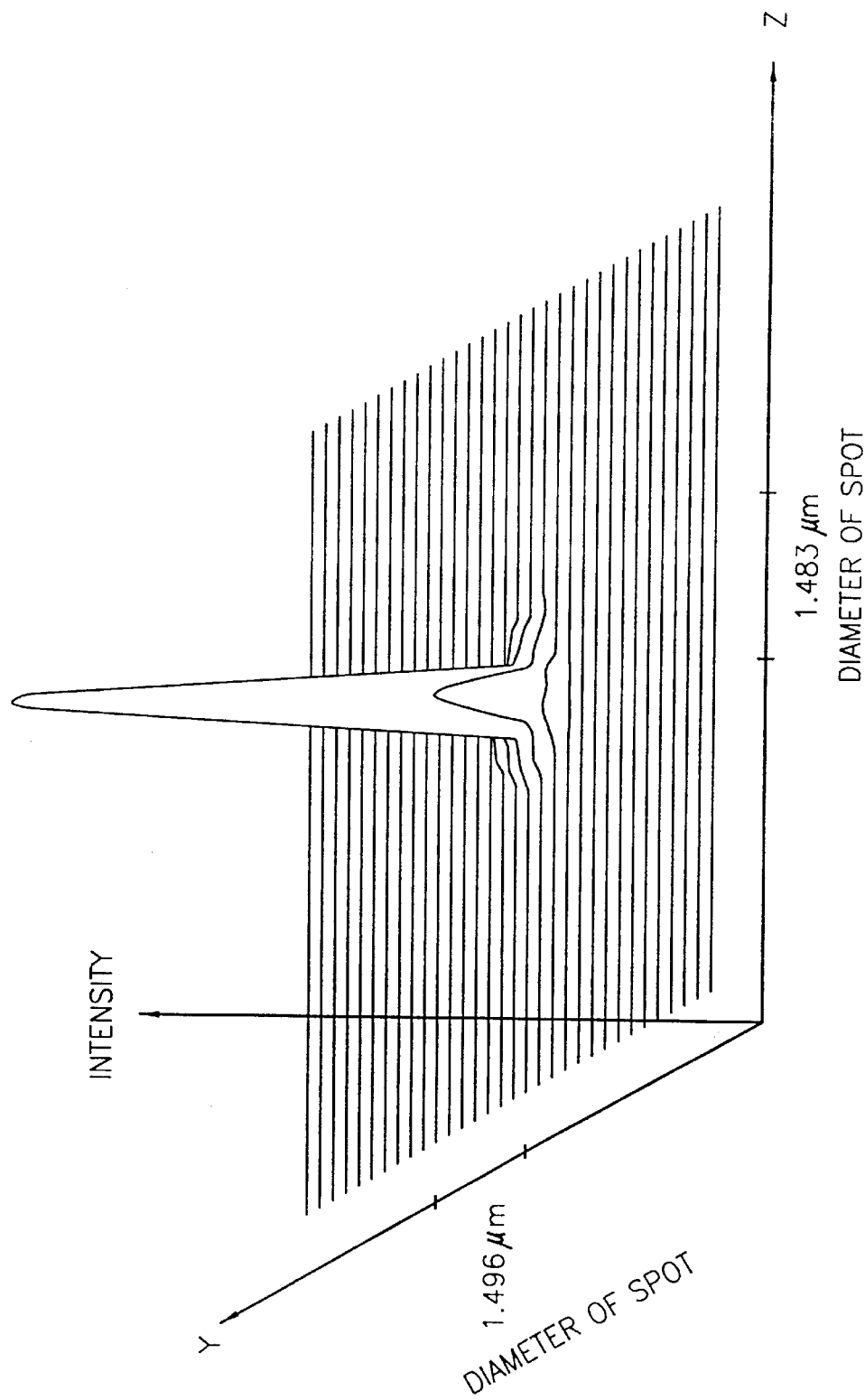
FIG. 5 is a three-dimensional graph showing an intensity distribution of an optical spot formed by the optical pickup apparatus of the present invention.

As a result of the above embodiment, the intensity distribution of the optical spot focused on the optical disk 10 is shown in FIG. 5. A diameter of the spot at a position where the optical intensity becomes 1/e2 of the intensity distributed at the center thereof, is 0.85 μm.

Figure 6:
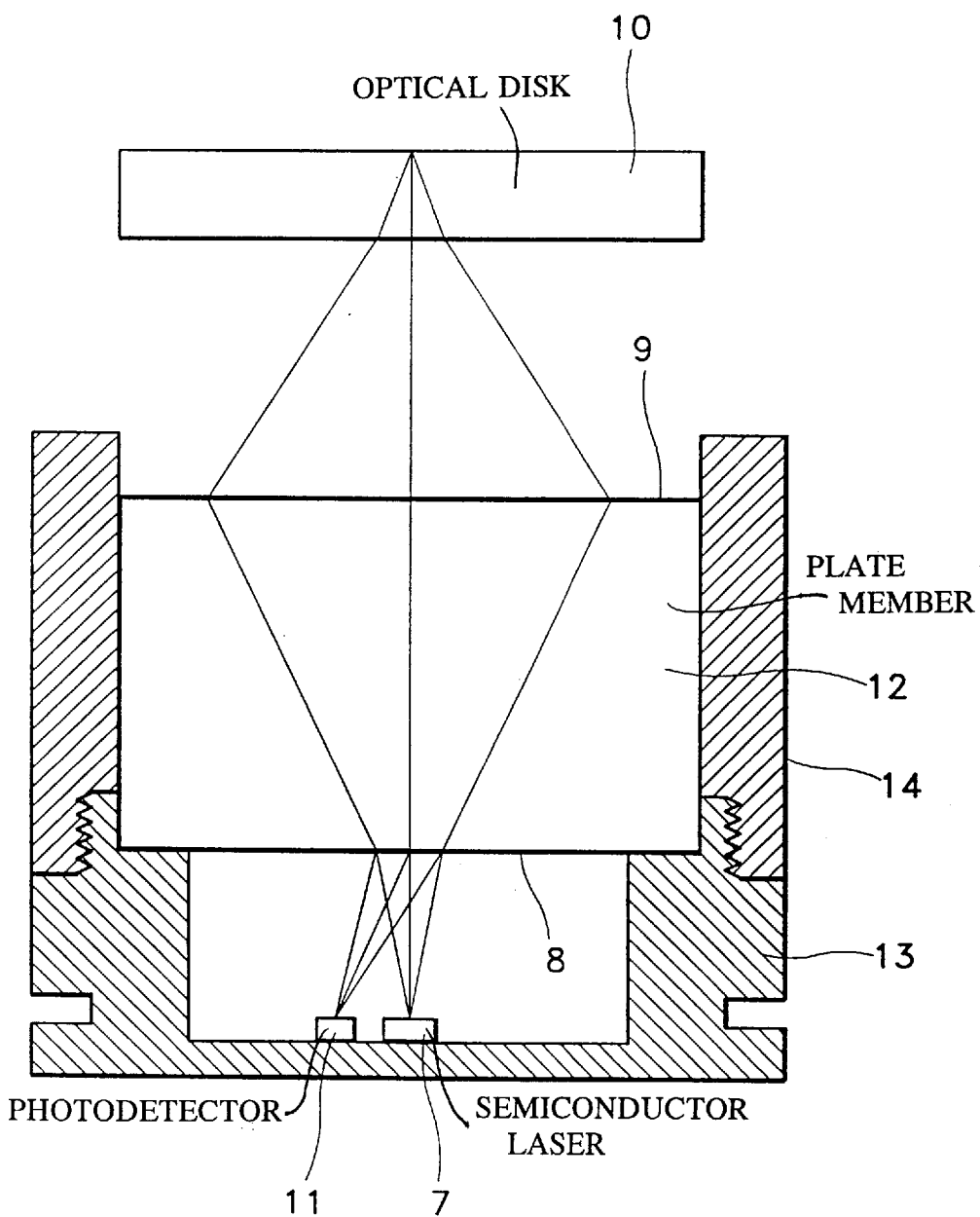
FIG. 6 is a sectional view showing a structure of an optical pickup assembly in which an optical system of the present optical pickup apparatus is integrated in a hybrid type.

FIG. 6 shows an optical pickup assembly in which all the optical parts of the optical pickup system shown in FIG. 2 are integrated in a hybrid type. The semiconductor laser 7 and the photodetector 11 are installed on a substrate 13 as a chip type and the plate member 12 having the first HOE 8 on the incident surface and the second HOE 9 on the emergent surface is supported by a tube 14. Also, the substrate 13 and the tube 14 are screw-coupled together. Here, reference numeral 10 represents an optical disk.

Figure 7:
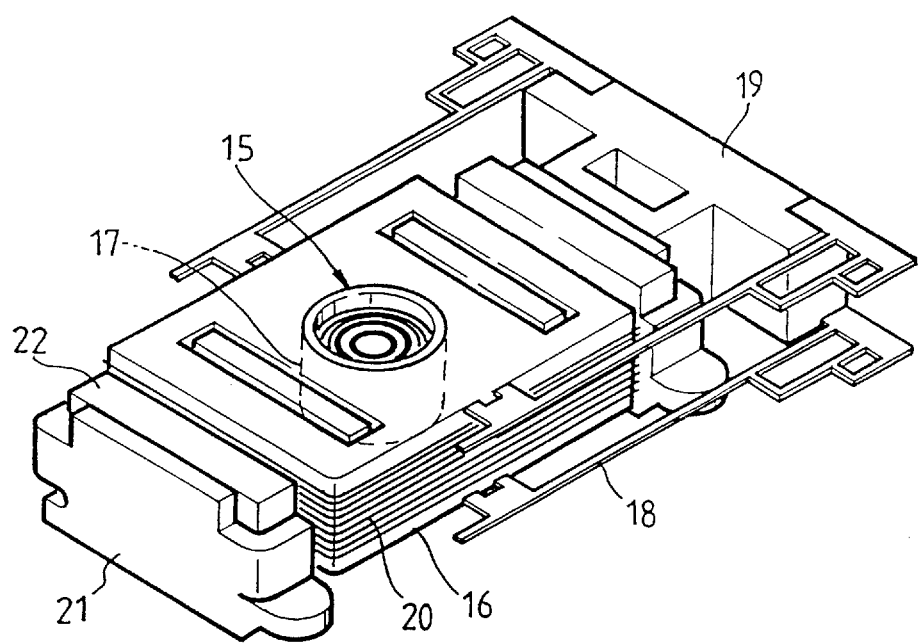
FIG. 7 is a perspective view showing an actuator where the optical pickup assembly shown in FIG. 6 is installed.

FIG. 7 shows an optical pickup structure including an actuator for integrally driving the optical pickup assembly shown in FIG. 6 for the tracking and focusing control with respect to the above-described optical disk. An optical pickup assembly 15 of the present invention is fixedly inserted into a hole 17 formed at the center of a holder 16. The holder 16 is supported by four elastic linear members 18 which are connected to the left and right sides thereof by two, so that the holder 16 can be moved in the tracking and focusing directions and returns to the initial position after movement. The other ends of the elastic linear members 18 are connected to a fixed block 19 located in the rear of the holder 16. Also, there are a driving coil 20 wound around the circumference of the holder 16, yokes 21 located in the front and rear portions of the holder 16, and permanent magnets 22 each attached to the yokes 21. When a control current is applied to the driving coil 20 in order to correct tracking and focusing errors on the basis of the tracking and focusing error signals detected by the photodetector 11, the driving coil 20 is excited, and the magnetic flux of the permanent magnets 22 and that of the excited driving coil 20 are interlinked, so that horizontal and vertical forces are generated between the driving coil 20 and the permanent magnets 22 according to the amount and direction of the driving current. By the above forces, the holder 16 moves in the vertical and horizontal directions together with the optical pickup assembly 15. When the application of the driving current stops, the holder 16 returns to the initial position by the elasticity of the elastic linear members 18.

In the above-described optical pickup apparatus according to the present invention, the optical pickup assembly is very small (5mm×5mm×5mm or less), ultraslim, and ultralight, such that the weight of all of the optical parts is about 1 gram, which almost equals that of the conventional object lens. Thus, it is expected that the optical pickup apparatus of the present invention is influential on the miniaturization of various optical information processing systems. Particularly, since the optical pickup apparatus of the present invention has a very short optical path, a signal noise which occurs due to aberration caused by an optical axis offset generated from the inclination of the optical disk is very weak. Further, the optical pickup apparatus of the present invention can be integrally driven for tracking and focusing, providing the maximum optical performance without errors caused by the shift of the optical axis. Also, since the optical pickup apparatus of the present invention is integrally formed in a hybrid type, the manufacture and assembly thereof are very easy and the optical pickup apparatus has very strong durability. Thus, no lowering of the performance caused by a passing of time occurs and the power consumption is reduced due to a low optical loss.

The optical pickup apparatus of the present invention is not limited to the described embodiments and drawings and further modifications and changes can be made within the spirit and scope of this invention by a person skilled in the art. For example, an ordinary object lens can be used instead of the above-described second HOE. Also, for the separation of the reflected beam, the above first HOE may perform only the function as a beam expander while a beam splitter united with two right angle prisms instead of the above plate member is used, or a fine half mirror or prism is additionally provided between the semiconductor laser and the first HOE to split the beam. In this case, the photodetector is shifted into a proper position. Also, the actuator for driving the optical pickup assembly of the present invention may be provided as various types.

What is claimed is:

1. An optical pickup apparatus for optically recording and reproducing information on and from an optical recording medium, in which a beam reflected from the optical recording medium is separated from the optical path of the incident beam, the optical pickup apparatus comprising:
   a light source for generating and emitting a light beam;
   means for focusing the beam emitted from said light source on the optical recording medium;
   a photodetector for detecting an electrical signal by receiving the reflected beam separated from the optical path of the incident beam; and
   a holographic optical element for diffracting the beam diverged from said light source to enlarge a diverging angle of the beam.

2. An optical pickup apparatus as claimed in claim 1, wherein said holographic optical element diffracts the reflected beam to separate the reflected beam from the optical path of the incident beam.

3. An optical pickup apparatus for optically recording and reproducing information on and from an optical recording medium in which a beam reflected from the optical recording medium is separated from the optical path of the incident beam, the optical pickup apparatus comprising:
   a light source for generating and emitting an incident beam to the optical recording medium;
   a photodetector for detecting an electrical signal by receiving the reflected beam separated from the optical path of the incident beam;
   a first holographic optical element for diffracting the incident beam emitted from said light source to enlarge a diverging angle of the incident beam; and
   a second holographic optical element for diffracting and focusing the incident beam whose diverging angle is enlarged by said first holographic optical element on the optical recording medium.

4. An optical pickup apparatus as claimed in claim 3, further comprising a transparent plate member between said first holographic optical element and said second holographic optical element.

5. An optical pickup apparatus as claimed in claim 4, wherein said first holographic optical element comprises a first predetermined hologram pattern formed on an incident surface of said plate member, and said second holographic optical comprises a second predetermined hologram pattern formed on an emergent surface of said plate member.

6. An optical pickup apparatus as claimed in claim 3, wherein said first holographic optical element diffracts the reflected beam to separate the reflected beam from the optical path of the incident beam.

7. An optical pickup apparatus as claimed in claim 4, wherein said first holographic optical element diffracts the reflected beam to separate the reflected beam from the optical path of the incident beam.

8. An optical pickup apparatus as claimed in claim 5, wherein said first holographic optical element diffracts the reflected beam to separate the reflected beam from the optical path of the incident beam.

9. An optical pickup apparatus as claimed in claim 3, satisfying the following conditions:
   an interval between said light source and said first holographic optical element is 1 mm;
   a focal distance of an object ray in said first holographic optical element is 0.25 mm;
   a focal distance of a reference ray in said first holographic optical element is $\infty$;
   an interval between said first holographic optical element and said second holographic optical element is 3 mm;
   a focal distance of an object ray in said second holographic optical element is 0.25 mm;
   a focal distance of a reference ray in said second holographic optical element is $\infty$; and
   an interval between said second holographic optical element and the optical recording medium is 1.5 mm.

10. An optical pickup apparatus for optically recording and reproducing information on and from an optical recording medium, comprising:
   a light source for generating and emitting a light beam;
   a transparent plate member located between said light source and said optical recording medium, having a first holographic pattern formed on an incident surface thereof facing said light source for diffracting the beam diverged from said light source to enlarge a diverging angle of the beam and diffracting the beam reflected from the optical recording medium to separate the reflected beam from the optical path of the incident beam, and a second holographic pattern formed on an emergent surface thereof facing the surface of the optical recording medium for diffracting and focusing the incident beam whose diverging angle is enlarged by said first holographic pattern on the optical recording medium;

a photodetector for detecting an electrical signal by receiving the reflected beam separated by said first holographic pattern; and housing means for integrally accommodating said light source, said plate member and said photodetector.

11. An optical pickup apparatus as claimed in claim 10, wherein said housing means comprises a substrate on which said light source and said photodetector are mounted and a tube enclosing said plate member at the circumference thereof, said substrate and said tube being coupled together.

12. An optical pickup apparatus as claimed in claim 10, further comprising:

a holder for holding and supporting said housing means;

means for elastically supporting said holder to be movable at least in horizontal and vertical directions and to be returned to an initial position after the movement; and means for driving said holder to move at least in the horizontal and vertical directions.

13. An optical pickup apparatus as claimed in claim 12, wherein said driving means comprises:

a driving coil wound around said holder; and a magnet placed at a side of said holder to generate a magnetic flux with respect to at least part of said driving coil to generate a magnetic force between said driving coil and said magnet.

14. An optical pickup apparatus for optically reproducing information from an optical recording medium, comprising:

a light source to generate and emit an incident light beam;

a first holographic optical element to diffract the incident light beam emitted from said light source to enlarge a diverging angle of the beam; and a focusing element to diffract and focus the incident light beam whose diverging angle is enlarged by said first holographic optical element onto the recording medium.

15. An optical pickup apparatus as claimed in claim 14, wherein said first holographic optical element diffracts a light beam reflected from the optical recording medium as a result of the incident beam being focused onto the optical recording medium to separate the reflected light beam from an optical path of the incident light beam.

16. An optical pickup apparatus as claimed in claim 14, further comprising:

a transparent plate member;

wherein:

said first holographic optical element which diffracts a light beam reflected from the optical recording medium as a result of the incident beam being focused onto the optical recording medium to separate the reflected light beam from an optical path of the incident light beam, said focusing element is a second holographic element, and said transparent plate member has said first holographic optical element formed as a first pattern on an incident surface thereof facing said light source, and said second holographic optical element formed as a second pattern on an emergent surface thereof facing a surface of the optical recording medium.

17. An optical pickup apparatus as claimed in claim 16, wherein:

said first holographic optical element is a first pattern formed by overlapping a first plurality of concentric circles, in which intervals between adjacent ones of the first plurality of concentric circles decrease as a distance from a center of the concentric circles increases, and a plurality of parallel stripes extending in a predetermined direction; and said second holographic optical element is a second pattern formed by a second plurality of concentric circles, in which intervals between adjacent ones of the second plurality of concentric circles decrease as a distance from a center of the concentric circles increases.

18. An optical pickup apparatus as claimed in claim 14, wherein said first holographic optical element is a pattern formed by overlapping a plurality of concentric circles, in which intervals between adjacent ones of the concentric circles decrease as a distance from a center of the concentric circles increases, and a plurality of parallel stripes extending in a predetermined direction.

19. An optical pickup apparatus as claimed in claim 14, wherein said focusing element is an object lens.

20. An optical pickup apparatus as claimed in claim 14, further comprising a beam splitter united with two right angle prisms, between said first holographic optical element and said focusing element, to separate a light beam reflected from the optical recording medium as a result of the incident beam being focused onto the optical recording medium from an optical path of the incident light beam.

21. An optical pickup apparatus as claimed in claim 14, further comprising a half mirror, between said first holographic optical element and said light source, to separate a light beam reflected from the optical recording medium as a result of the incident beam being focused onto the optical recording medium from an optical path of the incident light beam.

22. An optical pickup apparatus as claimed in claim 16, further comprising:

a housing unit to integrally accommodate said light source, transparent plate member and said photodetector;

an elastic support unit to support said housing unit during motion of said housing unit and to bias said housing unit to an initial position after the motion has been completed; and a driving unit to drive said housing unit to perform the motion.

* * * * *

UNITED STATES PATENT AND TRADEMARK OFFICE
CERTIFICATE OF CORRECTION

PATENT NO. : 5,805,556
DATED : September 8, 1998
INVENTOR(S) : LEE et al.

It is certified that error appears in the above-identified patent and that said Letters Patent is hereby corrected as shown below:

On the title page;

Section [56], third line, "562,919    4/1896" should be --5,629,919    5/1997--;

fourth line, "Okki et al." should be --Ohki et al.--;

seventh line, "Upheap" should be --Opheij--;

Signed and Sealed this

Twelfth Day of January, 1999

Attest:

Attesting Officer          *Acting Commissioner of Patents and Trademarks*